United States Patent [19]

Miaskoff et al.

[11] E Re. 29,105

[45] Reissued Jan. 11, 1977

[54] APPARATUS FOR MAKING BOOKS

[75] Inventors: Leonard Miaskoff; David A. Reed, both of Easton, Pa.

[73] Assignee: Harris Corporation, Cleveland, Ohio

[22] Filed: Dec. 18, 1975

[21] Appl. No.: 642,178

Related U.S. Patent Documents

Reissue of:

[64] Patent No.: 3,816,866
Issued: June 18, 1974
Appl. No.: 357,608
Filed: May 7, 1973

[52] U.S. Cl. ..... 11/3; 270/56; 270/58; 271/9; 156/364

[51] Int. Cl.[2] ..... B42C 11/00

[58] Field of Search ..... 270/56, 58; 198/79, 198/80; 271/9, 57, 58; 118/1; 156/362–364

[56] References Cited

UNITED STATES PATENTS

| | | | |
|---|---|---|---|
| 2,640,208 | 6/1953 | De Florez et al. | 11/1 R |
| 3,132,360 | 5/1964 | Hawkes et al. | 11/5 |
| 3,519,264 | 7/1970 | Beacham et al. | 270/58 |
| 3,570,840 | 3/1971 | Sather et al. | 270/58 |
| 3,627,303 | 12/1971 | Zeewy | 270/56 |

*Primary Examiner*—Lawrence Charles

[57] ABSTRACT

An improved apparatus for making books and other sheet material articles includes a main conveyor for transporting groups of signatures to a covering station. A cover conveyor transports covers to the covering station where they are sequentially applied to the groups of signatures in a known manner. A first cover feed assembly sequentially feeds covers to the cover conveyor. In the event of a malfunctioning of a first cover feed assembly, a second cover feed assembly is activated to feed a cover to the cover conveyor. A detector for detecting a malfunctioning of the first cover feed assembly is capable of detecting either a failure to feed a cover or the feeding of double covers. In the event that double covers are fed, the double covers are rejected and the second cover feed assembly is activated.

8 Claims, 4 Drawing Figures

APPARATUS FOR MAKING BOOKS

Matter enclosed in heavy brackets [ ] appears in the original patent but forms no part of this reissue specification; matter printed in italics indicates the additions made by reissue.

BACKGROUND OF THE INVENTION

A known bookbinding system includes a signature conveyor assembly having a plurality of clamps which grip groups of signatures. The clamps carry the groups of signatures to a first station where a rotary knife cuts off the folds at the backs of the signatures. The books are then sequentially conveyed to a second station where the backs of the books are roughened. At one or more gluing stations, glue is applied to the roughened backs of the books. A cover feeder is effective to sequentially feed open covers to a covering station in a registered relationship with the books. After the covers have been applied to the books, the covers are formed by a cover breaker. The books are then delivered to trimmers for suitable trimming operations.

If the cover feeder in a known bindery fails to feed a cover to a covering station, the bindery is stopped and the malfunction of the cover feeding apparatus is corrected. If double covers are fed to the covering station, a jam-up or other malfunction of the covering apparatus may occur. Whether the covering apparatus fails to feed a cover or feeds double covers, it is necessary to stop the bindery and interrupt production in order to correct the fault.

SUMMARY OF THE PRESENT INVENTION

The present invention provides an apparatus for use in covering books, magazines, catalogs, or similar items. This apparatus includes a cover conveyor which sequentially transports covers to a covering station where they are applied to a book. A first cover feeder assembly is provided to feed covers to the cover conveyor. In the event of a malfunctioning of the first cover feed assembly, a second cover feed assembly is activated to feed covers to the cover conveyor. A detector for detecting a malfunctioning of the first cover feed assembly is capable of detecting either a failure to feed a cover or a feeding of double covers. In either case, the second cover feed assembly is activated to feed a cover without interrupting operation of the bindery.

Accordingly, it is an object of the invention to provide a new and improved apparatus for covering books or similar articles and which includes a cover conveyor for transporting covers to a covering station, a first cover feed assembly for feeding covers to the cover conveyor, and a second cover feed assembly which is effective to feed covers to the cover conveyor in the event of a malfunctioning of the first cover feed assembly.

Another object of this invention is to provide a new and improved apparatus as set forth in the next preceding object and wherein a detector assembly is provided to detect either a failure to feed a cover or the feeding of double covers by the first cover feed assembly.

BRIEF DESCRIPTION OF THE DRAWINGS

The foregoing and other objects and features of the present invention will become more apparent upon a consideration of the following description taken in connection with the accompanying drawings wherein.

DESCRIPTION OF PREFERRED EMBODIMENTS OF THE INVENTION

Figure 1:
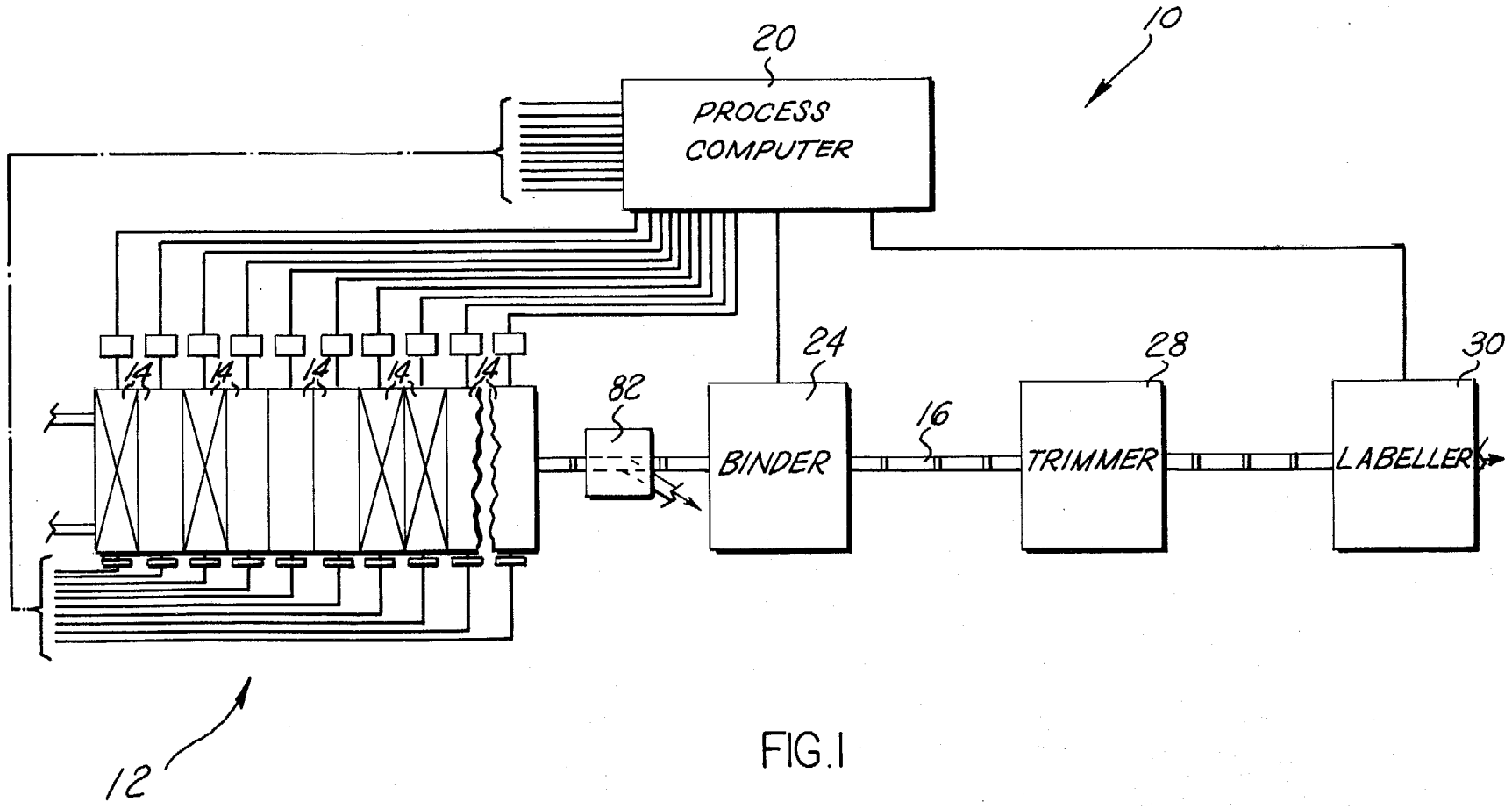
FIG. 1 is a schematic illustration of an apparatus for making books.

A system 10 for making books is illustrated in FIG. 1. This system includes a gatherer 12 having a plurality of feed mechanisms 14 for feeding signatures from supply hoppers or pockets onto a main conveyor assembly 16. During a cycle of operation of the gatherer 12, the feed mechanisms 14 are activated by process computer 20 to feed the signatures in such a manner as to form different books or magazines for different subscribers in accordance with predetermined criteria from known subscriber information, such as age, occupation, geographic location, etc. Thus, if the signatures are being grouped in accordance with geographic location, some of the feed mechanisms 14 would be operated to feed signatures while others would be ineffective to thereby provide a combination of signatures directed to a subscriber in a certain area, such as the North. If the subscriber lived in a southern area, the feed mechanisms 14 would be effective to form a different combination of signatures.

The signatures are transported by the conveyor 16 to a binder 24 then the signatures are bound into a book. The main conveyor 16 then transports the bound book to a trimmer 28 where the book is trimmed to a desired size in a known manner. Finally the conveyor 16 transports the bound and trimmed book to a labeler to be addressed to the subscriber who is to receive the particular combination of signatures contained in the book. The process computer 20 is utilized to control the operation of the binder 24, the trimmer 28 and labeler 30 in the manner disclosed in U.S. application Ser. No. 141,331 filed May 7, 1971, by Donald C. Harder and Victoriano F. Rana and entitled Method and Apparatus for Producing Magazines or the Like.

When groups 32 of signatures enter the binder 24, they are held in an on edge orientation with their folded backs down by a clamp assemblies 34 (FIG. 2) of the type illustrated in U.S. Pat. No. 3,132,360. The interconnected clamps 34 form a book conveyor 38 (FIG. 3) which is a part of the main conveyor assembly 16 and is utilized to transport the books through the binder 24 with the books in an upright orientation. As the books move through the binder 24, a rotary knife (not shown) cuts off the signature folds and the backs are then roughened. Adhesive is then applied to the backs of the books in a known manner.

After adhesive is then applied to the back of a book, a cover conveyor 42 (FIG. 2) transports a cover 44 to a covering station 46 (FIG. 3) where the cover is applied to the back of the book by suitable applicator 48. Since the bindery operations for preparing signatures and binding a cover onto a book are well-known, they will not be further described herein to avoid prolixity of description. However, it should be noted that the known bindery operations can be utilized to apply covers to magazines, booklets, or pamphlets.

A main feed mechanism 52 (FIG. 2) is provided in the binder 24 to feed covers 44 to the cover conveyor 42. In accordance with the present invention, a secondary cover feed mechanism 56 is provided to feed covers to the cover conveyor 42 in the event of a malfunction of the main cover feed mechanism 52. Therefore, if the main cover feed mechanism 52 should fail to feed a cover to the cover conveyor 42, the secondary cover feed mechanism 56 will supply the conveyor 42 with a cover so that an uninterrupted stream of covers is conducted to the covering station 46 by the cover conveyor 42 even if the main cover feed mechanism malfunctions.

The main cover feed mechanism 52 includes a conveyor 57 which transports a stream of flat or open covers 44 to a feed station 58. A sucker 59 at the feed station is connected with a source of low pressure through a solenoid operated valve 60. When a cover is to be fed, the valve 60 is opened under the control of the computer 20 and a drive mechanism 61 moves the sucker 59 through a feed stroke to feed an open cover into the nip of a pair of feed rollers 62.

After passing through the nip of the feed rollers 62, the cover moves to an inspection station 64. At the inspection station 64 a detector 66 detects that a cover is being fed from the main feed mechanism 52 to the cover conveyor 42.

In the event of a failure of the main feed mechanism 52 to feed a cover to the inspection station 64, a signal is transmitted from the detector 66 to the process computer 20 over leads 68. In response ot this signal, the process computer 20 activates the secondary feed mechanism 56 to feed a cover 44 to the cover conveyor 24 in the place which would normally have been occupied by the cover which was not fed by the main feed mechanism 52. Thus, even though the main feed mechanism 52 should skip or fail to feed a cover, the secondary feed mechanism 56 feeds a cover so that the cover conveyor 42 is effective to conduct a continuous stream of covers 44 to the covering station 46.

The secondary feed mechanism 56 includes a conveyor 70 which transports the covers to a feed station 71. When the process computer 20 activates the secondary feed mechanism 56, feed rollers 72 at the feed station 71 feed one cover 44 into the vacant position on the cover conveyor 42 resulting from a malfunction of the main feed mechanism 52. As this one cover is fed, the feeder and conveyor 70 are operated for a short period of time to move a next succeeding cover to the feed station 71.

It is contemplated that under certain circumstances the main feed mechanism 52 may feed two covers rather than one. The detector assembly 66 is of the caliper type and is effective to detect the feeding of more than one cover. Upon the detecting of the feeding of more than one cover, a signal is transmitted over the leads 68 to the process computer 20. Whereupon the process computer 20 activates a reject mechanism 76 to reject the double covers. In addition the process computer 20 will activate the secondary feed mechanism 56 to feed a cover 44 to the cover conveyor 42 in place of the rejected double covers.

Figure 2:
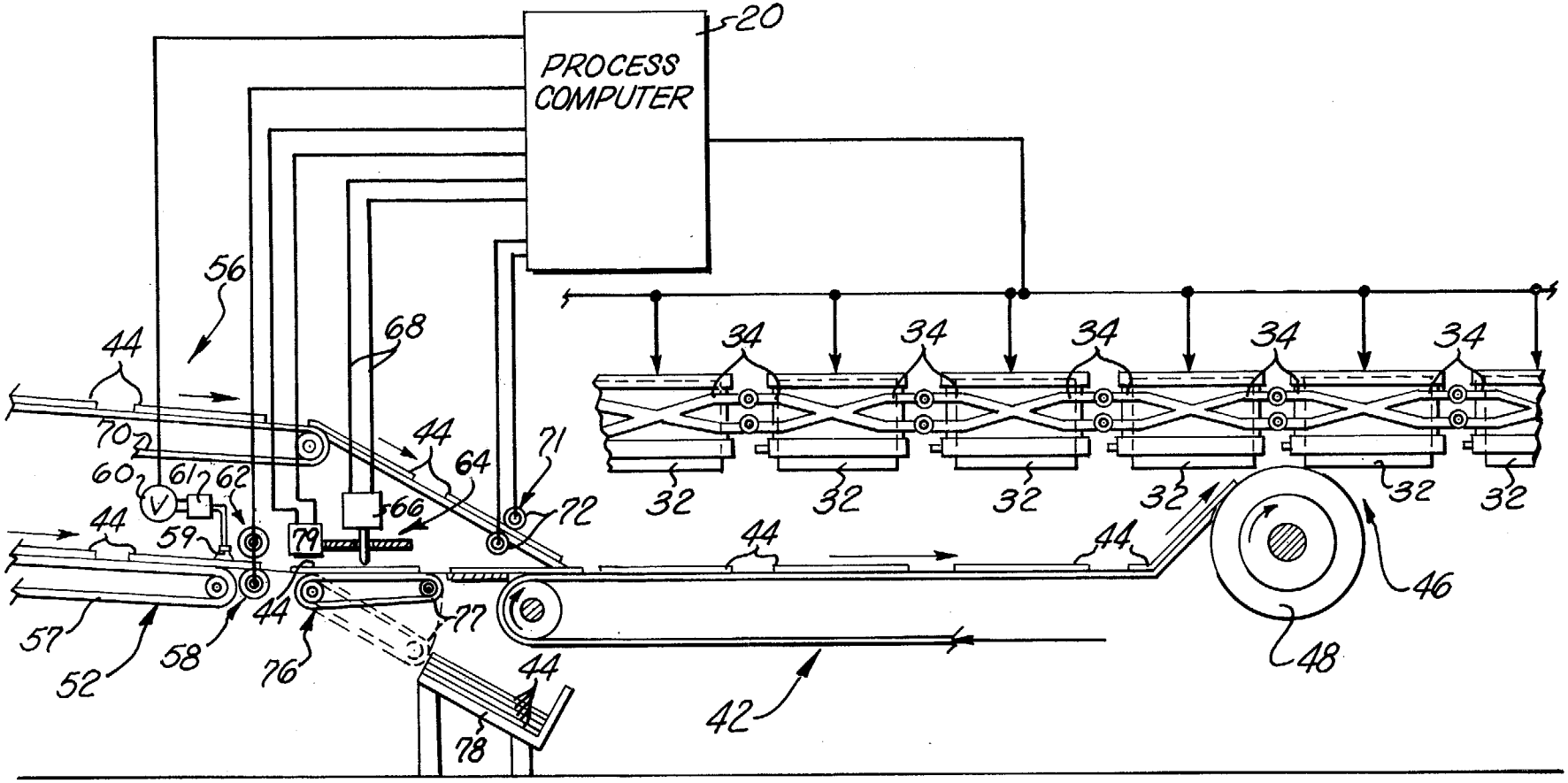
FIG. 2 is a schematic illustration of a cover feed arrangement utilized in a bindery of the book-making apparatus of FIG. 1.
Figure 3:
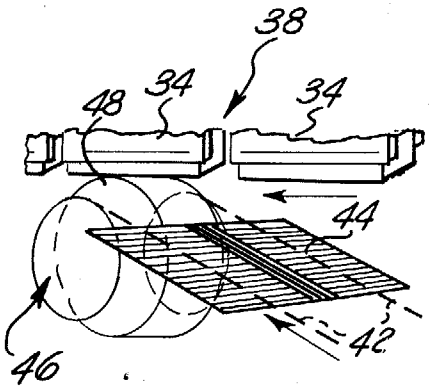
FIG. 3 is a schematic illustration of a covering station where covers are applied to books.

The reject mechanism 76 includes a divert gate 77 which is pivoted downwardly, to the position shown in dashed lines in FIG. 2, to direct the double [cover-sinto] covers into reject or double cover receiving bin 78. The divert gate 77 is constructed in a manner similar to that illustrated in U.S. Pat. application Ser. No. 176,851 filed Sept. 1, 1971, by Frederick T. Anderson and David A. Reed and entitled "Method and Apparatus for Producing Magazines or the Like." Of course, other known divert or reject mechanisms, such as the one disclosed in U.S. Pat. No. 2,991,603, could be used if desired.

The reject mechanism 76 includes a known drive mechanism, illustrated schematically at 79 in FIG. 2, which is activated by the computer 20 in response to detection of double covers 44 by the detector assembly 66. Activation of the reversible drive mechanism 79 moves the gate 77 between the feed position shown in solid lines in FIG. 2 and the divert position shown in dashed lines in FIG. 2.

If the gatherer 12 malfunctions, a reject mechanism 82 (FIG. 1) is activated to reject the defective book which results from the malfunction. The clamp assembly 34 associated with the rejected book will be empty when it arrives at the covering station 46. Of course, a cover 44 should not be supplied for the empty clamp assembly.

When a book is rejected, the computer 20 renders the main and secondary feed mechanisms 52 and 56 ineffective to feed a cover for the empty clamp assembly 34. This results in an opening in the stream of covers transported by the cover conveyor 42 to the covering station 46. Due to the coordination provided by the computer 20, the opening in the stream of covers arrives at the covering station 46 simultaneously with the empty clamp assembly 34.

When a book is rejected by reject mechanism 82, the resulting discontinuity in the flow of books to the binder 24 is noted by the computer 20. When the sucker 59 is to feed a cover to be associated with the rejected book, the computer 20 effects operation of the valve 60 to the closed condition. Therefore, the main feed mechanism 52 does not feed a cover to the cover conveyor 42 for association with the empty clamp assembly 34.

The detector 66 will detect the failure of the main feed mechanism 52 to feed a cover for association with the empty clamp assembly 34. A disabling circuit in the computer 20 will then prevent activation of the feed rollers 72. Therefore the secondary feed mechanism 56 is ineffective to feed a cover. This results in an opening in the series of covers conducted to the covering station 46 by the cover conveyor 42.

In the embodiment of the invention illustrated in FIG. 2 the feed mechanisms 52 and 56 are effective to feed similar covers to the cover conveyor 42. However, it is contemplated that different covers may be used with different books. Thus, if the gatherer 12 assembles a book for one geographic area, such as a northern area, and a book for another geographic area, such as a southern area, the book intended for the northern subscriber has one cover while the book intended for the southern subscriber may have another cover.

Figure 4:
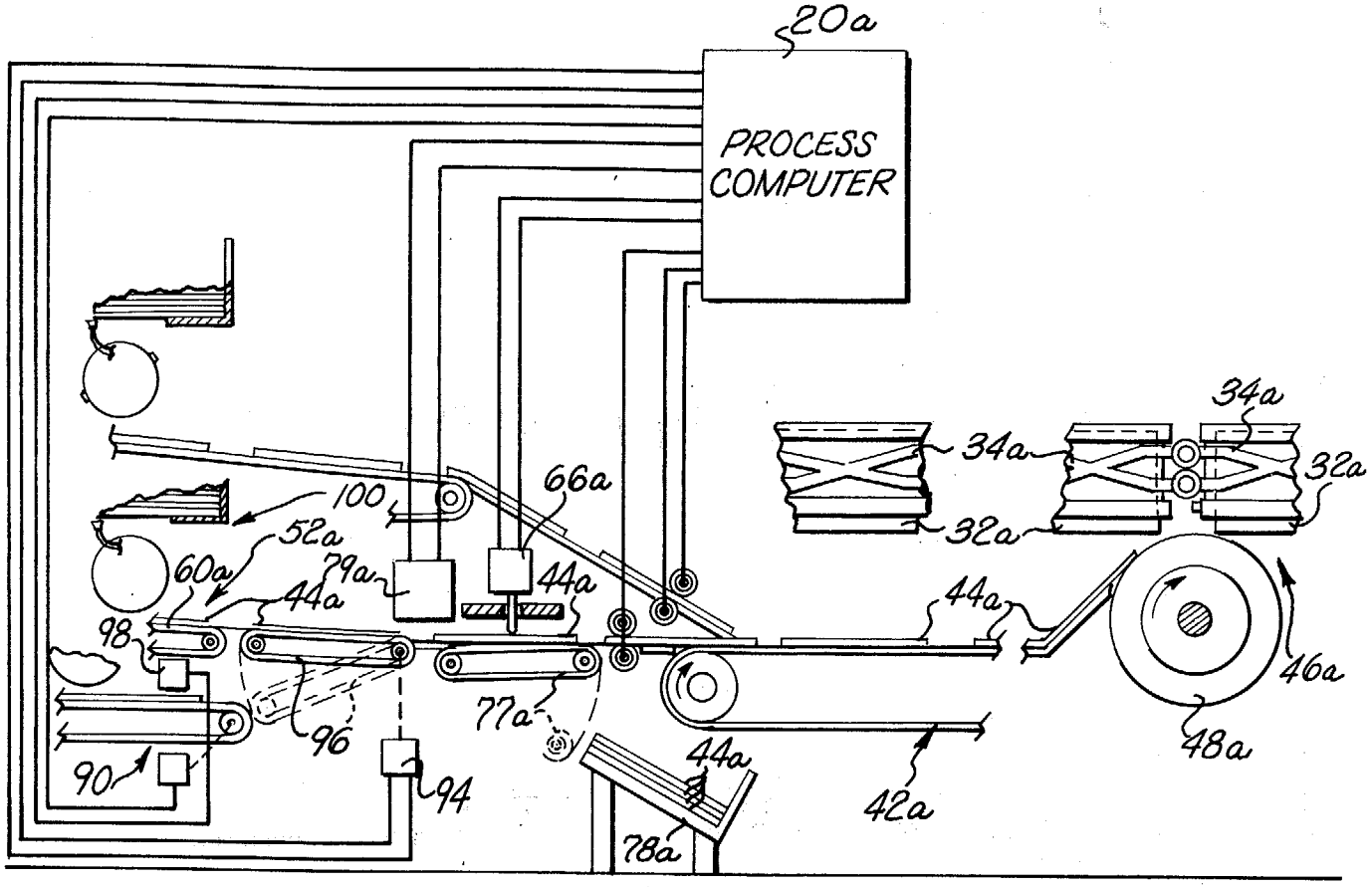
FIG. 4 is a schematic illustration of a second embodiment of invention.

Accordingly, in the embodiment of the invention illustrated in FIG. 4, three feed mechanisms are utilized to feed covers to the cover conveyor. One of these feed mechanisms feeds covers intended for one category of subscribers, such as subscribers in a northern area. The second feed conveyor feeds covers for books intended for subscribers who live in another area, such as a southern area. Finally, a third feed mechanism is provided to feed covers which are suitable for either of the two categories of subscribers. The third feed mechanism is activated in the event of a malfunctioning of one of the other two feed mechanisms. Since the embodiment of the invention illustrated in FIG. 4 is generally similar to the embodiment illustrated in FIGS. 1 through 3, similar numerals will be utilized to designate similar components, the suffix letter "a" being associated with the numerals of FIG. 4 to avoid confusion.

A first feed mechanism 52a is effective to feed covers 44a to a cover conveyor assembly 42a. The first feed mechanism 52a includes a hopper type feeder 100 for depositing covers onto a conveyor 60a. A second cover feed mechanism 90 is also effective to feed covers to the cover conveyor 42a. For example, the feed mechanism 52a feeds covers intended for northern subscribers while the feed mechanism 90 feeds covers intended for southern subscribers. Of course, the differences between the covers could be based upon subscriber age, income, occupation, etc., as well as geographic location of the subscriber.

The process computer 20a effects operation of the gatherer 12 to form combinations of signatures which are in accordance with known subscriber criteria in the manner disclosed in the aforementioned Harder and Rana application Ser. No. 141,331. The process computer 20a includes suitable registers for keeping track of the different combinations of signatures. In addition the computer includes controls for activating a drive mechanism 94 to move a divert gate 96 between a position (shown in solid lines in FIG. 4) in which it is effective to direct covers from the feed mechanism 52a to the cover conveyor 42a and a position (shown in dashed lines in FIG. 4) in which the gate 96 is effective to direct covers from the feed mechanism 90 to the conveyor 42a.

When the divert gate 96 is in the raised position shown in solid lines in FIG. 4, a drive mechanism 98 is activated by the computer 20a to feed a first type of cover. When the divert gate 96 is in the lowered position shown in dashed lines in FIG. 4, a drive mechanism 100 is activated by the computer to feed a second type of cover. By controlling the operation of the feed mechanisms 52a and 90 and the position of the gate 96, the computer 20a is effective to have different covers, associated with different subscribers, transported to the covering station 46a in timed relationship with different combinations of signatures.

A detector 66a is associated with feed mechanisms 52a and 90 to detect misfeeding or a double feed of covers by the feed mechanisms. If the detector 66a detects a failure of one of the feed mechanisms 62a or 90 to feed a cover or the feeding of double covers, the process computer 20 activates a third feed mechanism 106 to feed a standard cover which is suitable for any of the subscribers. In the event of a double feeding of covers by one of the cover feed mechanisms 52a or 90, a reject gate 77a is actuated by a drive mechanism 79a to reject the covers.

The computer 20 is effective to detect a malfunctioning of the gatherer 12 in forming a book for association with a cover fed by either the first cover feed mechanism 52a or the second cover feed mechanism 90. The reject mechanism is activated by the computer 20 to reject the defective book. In addition, the computer 20 renders the cover feed mechanism 52a or 90 ineffective to feed a cover for association with the rejected book. Of course, the computer 20 also renders the third feed mechanism 106 ineffective to feed a standard cover for association with the rejected book.

In view of the foregoing description, it can be seen that the system 10 includes a conveyor 42 which sequentially transports covers to a covering station 46. In the FIG. 2 embodiment, a first cover feed mechanism 52 is provided to feed covers to the cover conveyor 42. In the event of a malfunctioning of the cover feed mechanism 52, a second cover feed mechanism 56 is activated to feed a cover to the conveyor 42 so that a continuous stream of covers is conducted to the covering station 46. In the FIG. 4 embodiment cover feed mechanisms 52a or 90 are utilized to feed covers to the cover conveyor 42a. This enables books entitled for different subscribers to have different covers. In the event of a malfunctioning in one of the cover feed mechanisms 52a or 90, a third cover feed mechanism 106 is activated to feed a cover to the cover conveyor 42a. Although the binder 24 has been described herein in connection with soft cover books, it is contemplated that it could be utilized for hard cover books.

Having described specific preferred embodiments of the invention, the following is claimed:

1. An apparatus for use in covering books, said apparatus comprising book conveyor means for sequentially conveying a stream of books to a covering station, cover conveyor means for sequentially transporting a stream of covers to the covering station, first cover feed means for sequentially feeding covers to said cover conveyor means, detector means for detecting a malfunction of said first cover feed means and resulting opening in the stream of covers, second cover feed means for feeding a cover to said cover conveyor means at the opening resulting from the malfunctioning of said first cover feed means, and control means for activating said second cover feed means to feed a cover to said cover conveyor means in response to detection of a malfunction of said first cover feed means by said detector means.

2. An apparatus as set forth in claim 1 wherein said detector means includes means for detecting the feeding of double covers by said first cover feed means and wherein said apparatus further includes reject means for rejecting double covers fed by said first cover feed means.

3. An apparatus as set forth in claim 1 wherein said detector means includes means for detecting a failure of said first cover means to feed a cover to said cover conveyor means.

4. An apparatus as set forth in claim 1 further including gatherer means for forming signatures into groups to make books, and reject means for rejecting a defective book, said control means including means for rendering said first and second feed means ineffective to feed a cover for association with the rejected book.

5. An apparatus for producing different books of different predetermined combinations of signatures for different subscribers in accordance with predetermined criteria from known subscriber information, said apparatus comprising gatherer means for forming a combination of signatures in accordance with known subscriber criteria, said gatherer means including means for defining a plurality of feed stations, main conveyor means for transporting groups of signatures, feed means at each of said feed stations for feeding signatures to said conveyor means, control means for effecting operation of said feed means to form different combinations of signatures for different subscribers, cover applicator means disposed at a covering station for applying a cover to each of the different combinations of signatures, said main conveyor means being effective to sequentially transport the different combinations of signatures to the covering station, cover conveyor means for sequentially transporting covers to the covering station, first cover feed means for sequentially feeding covers to said cover conveyor means, detector means for detecting a malfunction of said first cover feed means, and second cover feed means for feeding covers to said cover conveyor means, said control means including means for activating said second cover feed means to feed a cover to said cover conveyor means in response to detection of a malfunction of said first cover feed means.

6. An apparatus as set forth in claim [4] *5* further including third cover feed means for feeding covers which are different than the covers fed by said first and second cover feed means, said control means including means for effecting operation of said first cover feed means to feed covers to combinations of signatures for one group of subscribers and for effecting operation of said third cover feed means to feed covers to combinations of signatures for another group of subscribers.

7. An apparatus as set forth in claim [4] *5* further including reject means for rejecting defective books formed as a result of a malfunctioning of said gatherer means, said control means including means for rendering said first and second cover feed means ineffective to feed a cover for association with the rejected book.

*8. A collating apparatus for collating first and second sheet material articles comprising conveyor means for sequentially conveying the collated article, first feed means for sequentially feeding one of said sheet material articles individually to said conveyor means, detector means for detecting a malfunction of said first feed means, second feed means adjacent said first feed means for feeding individual sheet material articles to said conveyor means as a substitute for the articles fed from said first feed means, and control means for activating said second feed means to feed a substitute article in response to detection of a malfunction of said first feed means by said detector means.*

* * * * *